United States Patent
Köstli et al.

(10) Patent No.: US 10,730,614 B2
(45) Date of Patent: Aug. 4, 2020

(54) ROTOR MAST

(71) Applicant: KOPTER GROUP AG, Mollis (CH)

(72) Inventors: Roman Köstli, Hittnau (CH); Martin Stucki, Pfäffikon (CH)

(73) Assignee: KOPTER GROUP AG, Mollis (CH)

( * ) Notice: Subject to any disclaimer, the term of this patent is extended or adjusted under 35 U.S.C. 154(b) by 279 days.

(21) Appl. No.: 15/815,946

(22) Filed: Nov. 17, 2017

(65) Prior Publication Data

US 2018/0141648 A1 May 24, 2018

(30) Foreign Application Priority Data

Nov. 21, 2016 (CH) ........................................ 1535/16

(51) Int. Cl.
*B64C 27/12* (2006.01)
*B64D 35/00* (2006.01)
*F16H 1/28* (2006.01)
*F16H 1/32* (2006.01)

(52) U.S. Cl.
CPC .............. *B64C 27/12* (2013.01); *B64D 35/00* (2013.01); *F16H 1/2836* (2013.01); *F16H 2001/327* (2013.01)

(58) Field of Classification Search
CPC ....... B64C 27/12; B64D 35/00; F16H 1/2836; F16H 2001/327
USPC .......................................................... 244/60
See application file for complete search history.

(56) References Cited

U.S. PATENT DOCUMENTS

| 4,251,987 A | 2/1981 | Adamson |
| 5,802,918 A * | 9/1998 | Chen ........................ B64C 27/12 74/409 |
| 6,877,904 B2 | 4/2005 | Bouille |
| 9,260,186 B1 * | 2/2016 | van der Westhuizen ..................... B64C 27/605 |
| 2014/0212082 A1 * | 7/2014 | Gegner ................... F16C 33/58 384/565 |

FOREIGN PATENT DOCUMENTS

| CH | 256401 A2 | 8/1948 |
| DE | 19756967 A1 | 6/1999 |

(Continued)

OTHER PUBLICATIONS

Search Report dated Mar. 15, 2017 for CH-01535/16 filed Nov. 21, 2016.

*Primary Examiner* — Claude J Brown
(74) *Attorney, Agent, or Firm* — Paul D. Bianco; Guy S. Winer; Fleit Intellectual Property Law (57) ABSTRACT

In a rotor mast for a rotorcraft, the rotor mast can be coupled in a rotationally fixed manner to a drive unit of a helicopter rotor transmission, which allows a particularly smooth running operation. This is achieved in that the rotor mast is configured in two parts, and comprises a bearing mast and an outer mast, with the outer mast, configured as a hollow body, is mounted, concentrically surrounding the bearing mast, such that it can rotate about a central axis relative to the bearing mast. The outer mast can be operatively connected with the helicopter rotor transmission, and the bearing mast can be mounted in the rotorcraft in a locationally and rotationally fixed manner, such that the outer mast can be coupled with a main rotor in a rotationally fixed manner, and can be set in rotation with the helicopter rotor transmission.

16 Claims, 5 Drawing Sheets

(56) References Cited

FOREIGN PATENT DOCUMENTS

| | | |
|---|---|---|
| DE | 198 41 853 A1 | 3/2000 |
| EP | 2610525 A1 | 7/2013 |
| WO | 98/16762 A1 | 4/1998 |
| WO | 02/02957 A1 | 1/2002 |

* cited by examiner

ROTOR MAST

FIELD OF THE INVENTION

The present invention describes a rotor mast of a rotorcraft, in particular a helicopter, as well as the coupling of the rotor mast with a helicopter rotor transmission.

BACKGROUND

In the field of helicopter construction, the main rotor is usually coupled via a rotor mast, coupled with the main rotor, with a helicopter rotor transmission, usually driven in the form of a planetary transmission. The rotor mast of a helicopter can be considered, by virtue of its function, to be a drive shaft for the main rotor.

In the case of the helicopter type "Eurocopter AS 350", the rotor motor is, for example, coupled with a helicopter transmission comprising a planetary gear, in that the rotor mast can be fixed in a rotationally fixed manner in a central accommodation region of the helicopter transmission. Such a helicopter transmission is in turn housed in a transmission housing. The transmission housing is attached to the load-bearing structure of the helicopter at a plurality of points and is coupled to a rotor.

In the case of the "Eurocopter AS 350", the planetary transmission has a plurality of externally-toothed planetary gears, which are mounted on associated planetary carriers. As dictated by the design the planetary gears are mounted in a locationally fixed gear ring, in the form of an internally-toothed ring gear, such that they can rotate about themselves and within the ring gear. In this case, the planetary gears respectively rotate about their planetary axis and simultaneously rotate or rotate about a central rotor mast axis within the gear ring. The rotation of the planetary gears is effected by a rotational drive of a central sun wheel, which is also locationally fixed, but is mounted such that it can rotate about the central rotor mast axis.

A drive rotates the central sun wheel so that the rotational movement is transferred, via the sun wheel and the planetary gears, via a planetary carrier, connected in a rotationally fixed manner to the planetary gears and acting as a force transfer device, onto the rotor mast, which in turn is connected with the planetary carrier in a rotationally fixed manner, wherein the rotor mast protrudes from the side of the transmission housing remote from the drive train side.

This corresponds to a compact, light, sufficiently powerful and robust arrangement of a rotor mast driven by a helicopter rotor transmission.

A fundamental problem of such rotor masts of known art, configured in such a manner and arranged in a helicopter is the guarantee of a smooth running operation.

SUMMARY OF THE INVENTION

In an embodiment, a rotor mast for a rotorcraft, in particular for a helicopter, allows a particularly smooth running operation.

This is achieved by a rotor mast as disclosed herein, wherein a particularly smooth drive of a main rotor can be achieved by the two-part configuration of the rotor mast.

Furthermore, it has been found to be advantageous that, when the main rotor is driven by the inventive two-part rotor mast, a lower rotational bending and, as a result, less fatigue occurs than in the one-part rotor masts of known art, such as, for example, in the "Eurocopter AS 350" of known art.

In addition, an extremely compact arrangement could be achieved by virtue of the inventive two-part rotor mast, which allows the routing of cabling, control rods and other components from the drive train side to the rotor side, as explained below.

Further advantageous embodiments are also disclosed.

BRIEF DESCRIPTION OF THE DRAWINGS

A preferred example of embodiment of the subject matter of the invention is described below in connection with the accompanying drawings.

FIG. 5a shows a perspective view of the gear driver with cross-toothing, while

FIG. 5b shows a perspective view of the outer mast/gear ring flange with cross-toothing.

DETAILED DESCRIPTION

In the following a helicopter rotor transmission 1, with a rotor mast 2 configured in two parts, mounted therein is described in FIG. 1, wherein the helicopter rotor transmission 1 coupled to the rotor mast 2 is embodied in the form of a planetary transmission, and can be used to drive a main rotor or a tail rotor. The helicopter rotor transmission 1 is surrounded by a transmission housing 10, whereby the various components are held, protected against external influences. By means of at least one transmission housing mounting 100, the transmission housing 10 can be attached to a helicopter support structure (not shown). The transmission housing 10 is closed with a housing cover 101, which here is schematically indicated by dashed lines.

Figure 1:
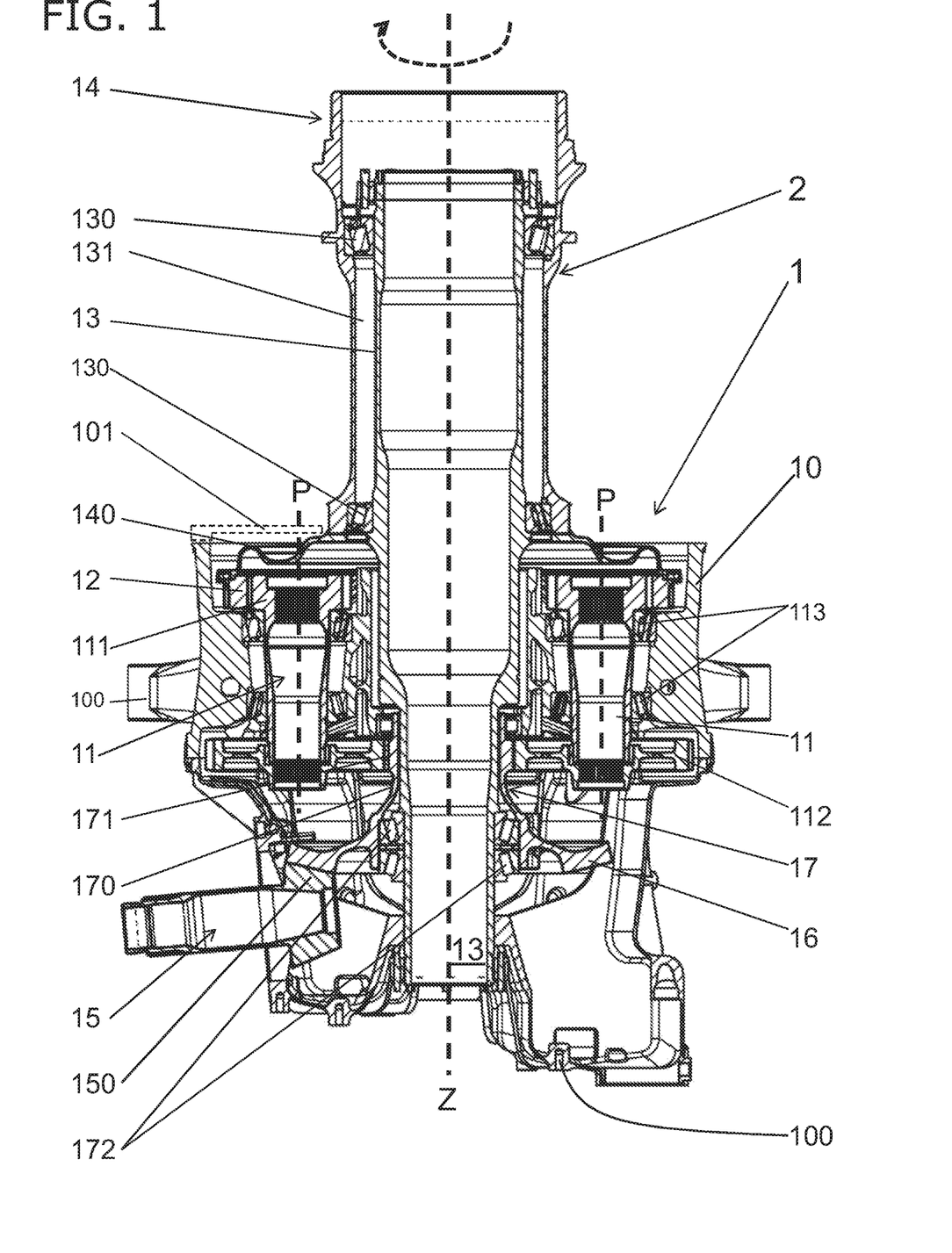
FIG. 1 shows a longitudinal section of an inventive two-part rotor mast, which is installed in a helicopter rotor transmission.

The rotor mast 2, configured in two parts, shown in FIG. 1 comprises a bearing mast 13 and an outer mast 14 configured as a hollow body, wherein the outer mast 14 concentrically surrounds the bearing mast 13. The helicopter rotor transmission 1 has a central cavity. In this central cavity, the bearing mast 13 is mounted in a locationally and rotationally fixed manner; this is configured as a hollow body surrounding a central axis Z. The central axis Z simultaneously defines the longitudinal direction of the bearing mast 13 and an axis of rotation of the rotatable outer mast 14 mounted about this central axis Z relative to the bearing mast 13, wherein the central axis Z is also referred to as the rotor mast axis. As can be seen in FIG. 1, the rotatable outer mast 14 of the rotor mast 2 is coupled to the helicopter rotor transmission 1, and is thereby operatively connected with the latter.

The bearing mast 13 can be configured in different lengths in the longitudinal direction along the central axis Z, wherein it extends at least partially through the centre of the transmission housing 10. Here, the bearing mast 13 can be provided with suitable fixing means in order to be arranged in the central cavity of the drive unit of the helicopter rotor transmission 1 in a locationally and rotationally fixed manner. Here in FIG. 1, the bearing mast 13 is configured so as to extend completely across the transmission housing 10, wherein control rods (not shown) or electrical lines such as cables or the like can be routed through the central cavity in the bearing mast 13. As a result of such a location in the bearing mast 13, the control rods or cables cannot be damaged by external influences such as bird strike, etc., in contrast to an arrangement outside the rotor mast 2.

As can also be seen in FIG. 1, the bearing mast 13 is here configured so as to taper from the rotor side in the direction of the drive train side, whereby the bearing mast 13 can be inserted from the rotor side into the central cavity of the transmission housing 10, and can be attached in the transmission housing 10.

A drive gear 16 functioning as a drive unit is mounted on the bearing mast 13 such that it can rotate, wherein the drive gear 16 here has helical bevel gear toothing, which can interact with at least one drive train gear 150 of at least one drive train 15. As an alternative to helical toothing, the drive gear can have spiral toothing. A sun wheel 17, which is designed as a hollow shaft, is connected to the drive gear 16; the sun wheel 17 has a tubular section 170 with, for example, straight toothed external toothing 171. By means of the sun wheel 17, the drive gear 16 is attached to the locationally and rotationally fixed bearing mast 13, and is mounted such that it can rotate about the central axis Z. As shown here in FIG. 1, the sun wheel 17 is mounted on two sun wheel bearings 172 such that it can rotate on, i.e. around, the bearing mast 13. The sun wheel 17 can be driven by the drive train 15, whereby the sun wheel 17 represents a hollow driving shaft.

At the height of the external toothing 171 of the sun wheel 17, a plurality of planetary drive gears 112 are arranged on associated planetary gear carriers 11, for example by means of splined toothing, wherein the planetary gear carriers can be regarded as planetary shafts. The planetary drive gears 112 each have external toothing and are in engagement with the external toothing 171 of the sun wheel 17.

The planetary gear carriers 11 are configured so as to be fixed in location and are spaced apart from the transmission housing 10, i.e. from the central axis Z, i.e. from the rotatable sun wheel 17 such that the planetary drive gears 112 and their planetary gear carriers 11 can be set in rotation at a fixed location within the transmission housing 10. In order to achieve rotation of the planetary gear carriers 11 that is as free of friction as possible, at least two planetary gear carrier bearings 113 are arranged spaced apart in the direction of a planetary gear axis P between the walls of the transmission housing 10 and the planetary gear carriers 11.

The planetary gear carriers 11 are configured as double planetary gear carriers, since a planetary gear 111 is arranged on each planetary gear carrier 11 spaced apart in the direction of the planetary gear axis P for each planetary drive gear 112. The planetary drive gears 112 are in each case arranged parallel to the associated planetary gears 111. The plurality of planetary gear carriers 11 are distributed about the central axis Z, distributed around the outer circumference of the bearing mast 13 and arranged at a fixed location in the transmission housing 10. The planetary gears 111 and the planetary drive gears 112 of all planetary gear carriers 11 here have sufficient clearance from the walls of the transmission housing 10 and from the bearing mast 13, which is locationally and rotationally fixed. In this manner an undisturbed rotation of the planetary gear carriers 11 and thus the planetary gears 111 is possible, in each case about their planetary gear axes P.

The helicopter rotor transmission 1 shown here can be regarded as a two-stage planetary transmission, which is why, in accordance with the inventive helicopter rotor transmission 1, a hollow shaft rotatably mounted around the locationally and rotationally fixed bearing mast 13 functions as the sun wheel 17. Here the bearing mast 13 crosses the transmission housing 10 completely, and protrudes from the transmission housing 10 on the side remote from the drive train 15.

At the height of the planetary gears 111 in the direction of the central axis Z, a gear ring 12 is rotatably arranged about the central axis Z. The gear ring 12 surrounds all the planetary gears 111, can be driven by the rotation of the planetary gears 111, and can thus rotate about the planetary gears 111, the central axis Z, and in accordance with the embodiment shown, surrounding the outer circumference of the bearing mast 13.

Figure 3:
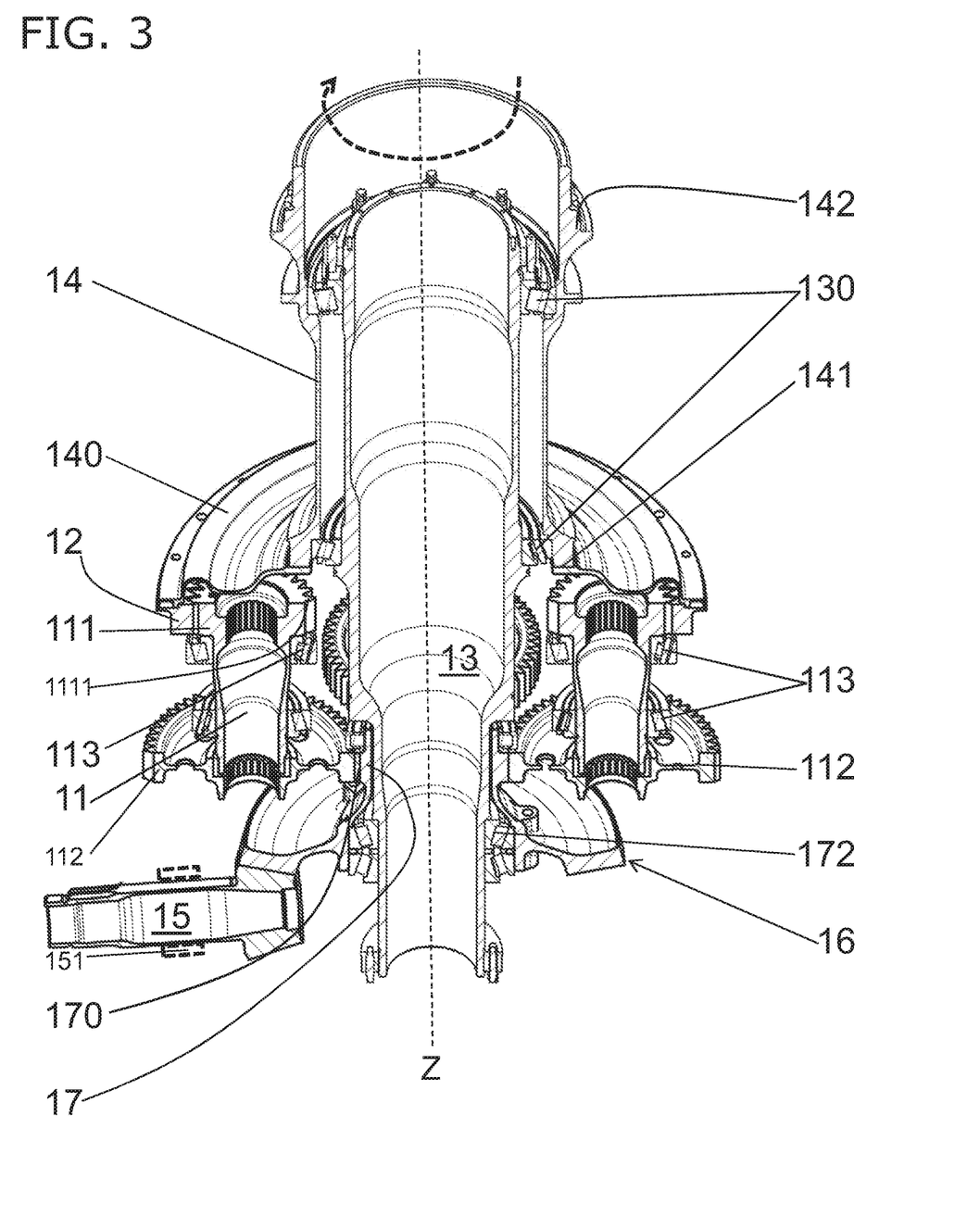
FIG. 3 shows a longitudinal section through the helicopter rotor transmission, wherein the transmission housing and the housing cover are omitted on the rotor mast side.

A gear ring driver 140, preferably designed in accordance with FIG. 3 as an annular component acting as a force transfer device, is arranged on the gear ring 12, by means of which the rotation of the gear ring 12 can be transferred to the rotatable outer mast 14. The housing cover 101 closes the gear housing 10 so as to surround the gear ring driver 140. For this purpose, the housing cover 101 is attached to the transmission housing 10 and protrudes until just before the rotatable outer mast 14. The housing cover 101 is thus not attached on the rotor mast side, so that the outer mast 14 can rotate without any problems.

The outer mast 14 is of tubular design and is here rotatably mounted concentrically aligned about the part of the bearing mast 13 protruding from the transmission housing 10. The longitudinal axes of the two masts 13, 14 are thus aligned, wherein only the outer mast rotates about the axis Z.

The outer mast 14 is designed as a hollow shaft and forms a drive shaft, which can be driven indirectly by means of the helicopter rotor transmission 1 through the drive train 15. A rotor head, comprising a plurality of rotor blades, is attached to the side of the outer mast 14 which is opposite the helicopter transmission 1. For purposes of mounting the outer mast 14, further bearings 130 are provided between the bearing mast 13 and the outer mast 14; here two bearings 130 are spaced apart from one another along the central axis Z. A cavity 131 can optionally be formed between the bearing mast 13 and the rotor mast 14, in which, for example, a tube feeding lubricating oil to the bearings 130 can be arranged.

Figure 2:
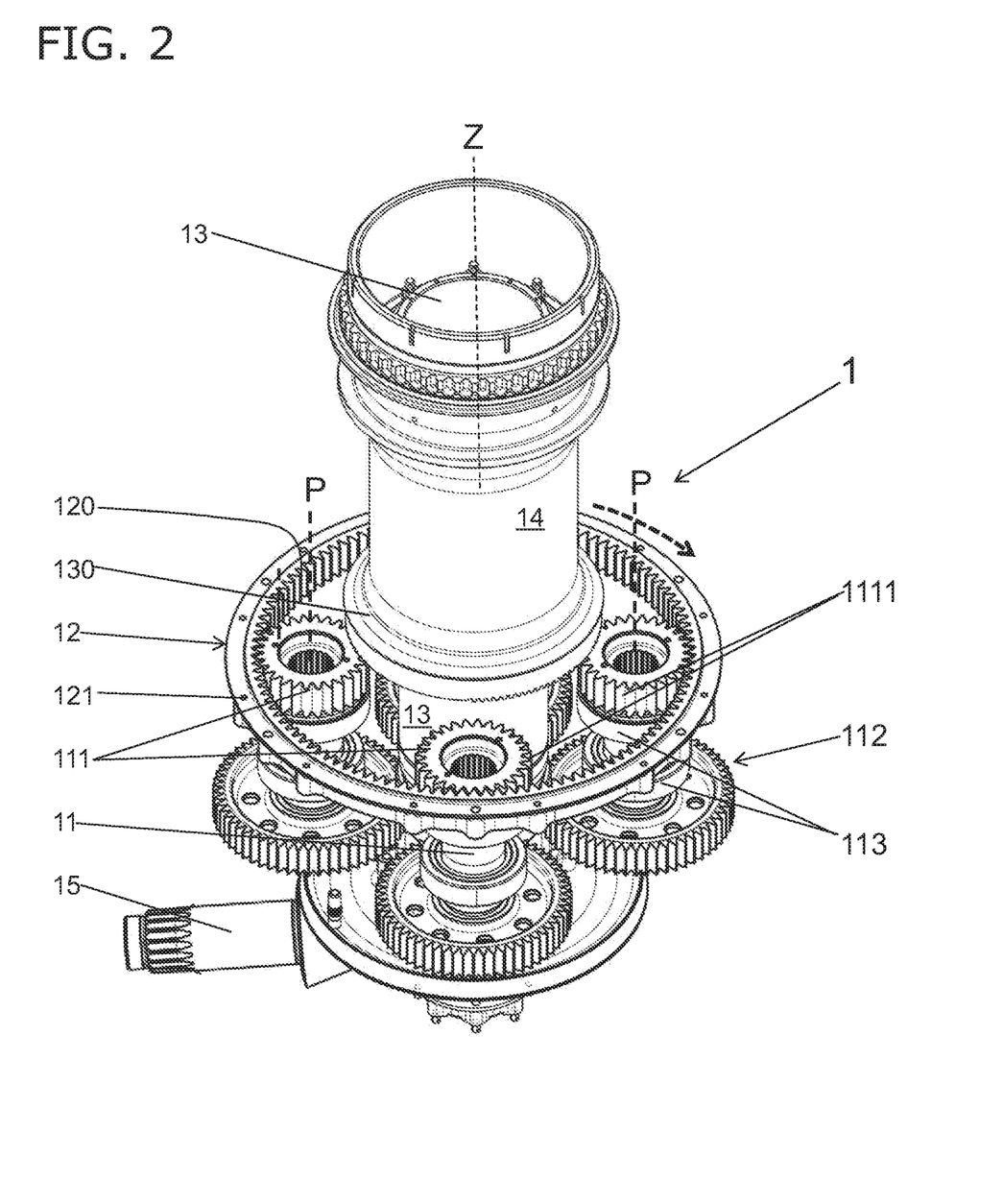
FIG. 2 shows a schematic view of the helicopter transmission with the transmission housing removed, after it has been installed on the bearing mast, before the installation of a gear ring driver.

In FIG. 2, the rotation of the gear ring 12 around the outer contours of the planetary gears 111 is indicated by the arrow at the top of the figure. While the planetary gears 111 and the planetary gear carriers 11 rotate about fixed axes, the gear ring 12 runs around the central axis Z. Internal toothing 120 is arranged on the gear ring 12, which engages with external toothing 1111 on all the planetary gears 111. In this embodiment the gear ring 12 rotates, so that the planetary gears 111 are mounted on fixed axes. The gear driver 140 can be attached to the rotating gear ring 12 by means of attachment 121, for example through-holes, or threaded holes and appropriate screws. Here the means of attachment 121 are arranged distributed along the circumference on a surface directed towards the central axis Z, spaced apart from the bearing mast 13. A bearing 130 between the bearing mast 13 and the outer mast 14 (not shown) is represented surrounding the fixed bearing mast 13.

With the housing cover 101 removed the longitudinal section through the helicopter transmission 1, together with the bearing mast 13 and the outer mast 14 in accordance with FIG. 3, allows an insight into the configuration of the gear ring driver 140 and the connection to the outer mast 14. The gear ring driver 140 is designed in the form of a hood, which prevents any contact between the gear ring driver 140 and the planetary gears 111. The gear ring driver 140 is connected on one side to the gear ring 12, and on the side facing the central axis Z to the outer mast 14. The configuration of the gear ring driver 140 should be as light as possible, but sufficiently robust; accordingly, an annular, hood-like or hood-shaped component made of steel, titanium, or the like with a wall thickness of preferably 2 to 12 mm, and more preferably 3 to 8 mm, with these properties here forms the gear ring driver 140.

The drive gear 16 is rotated by the drive train 15, which is mounted by means of drive train bearings 151. By virtue of the resulting rotation of the sun gear 17 connected to the drive gear 17 and the associated external toothing 171, the rotation is transmitted to the planetary drive gears 112 and thus the planetary gears 111, wherein this can be regarded as a first stage of the present two-stage planetary transmission. In a second stage, the planet gears 111 transfer the forces to the internal toothing 120 of the gear ring 12 and the resulting rotation of the gear ring 12 about the central axis Z is transmitted by means of gear ring drivers 140 to the outer mast 14, which protrudes out of the transmission housing 10. The torque from the gear ring 12 is thus transferred to the outer mast 14 by means of gear ring drivers 140.

Figure 4:
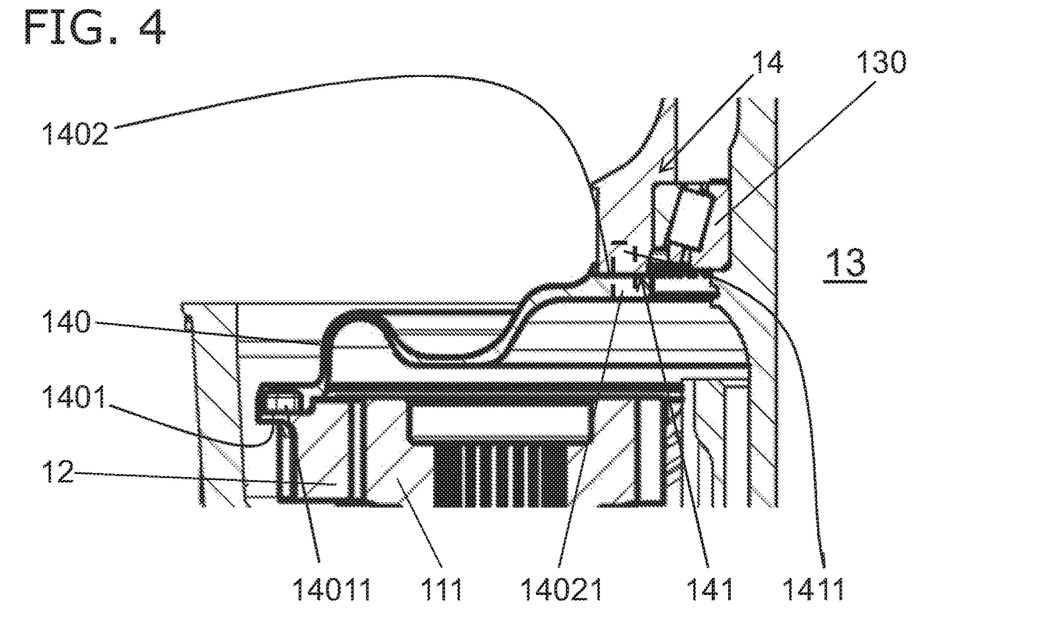
FIG. 4 shows a sectional view through the rotor mast side part of the helicopter transmission, with a detailed view of the gear driver and the attachment to the rotatable outer mast of the rotor mast.
Figures 5A, 5B:
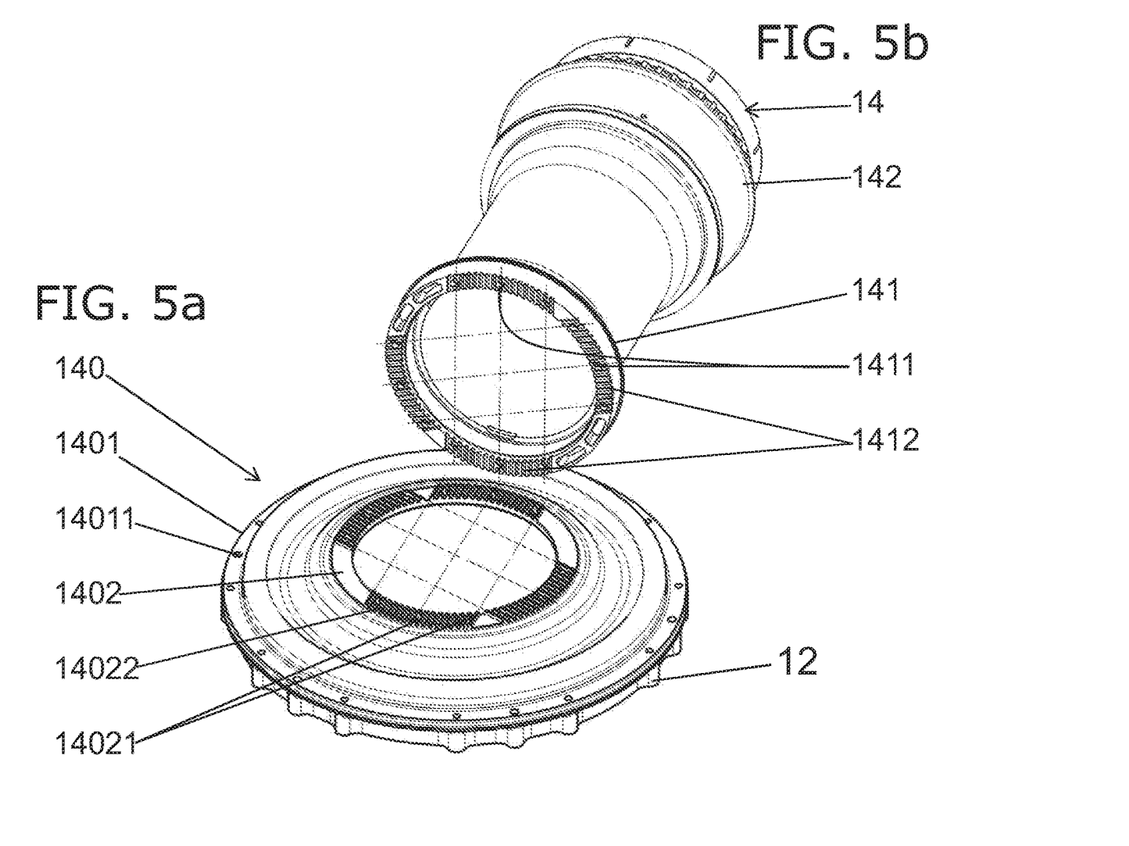

The outer mast 14 has an outer mast/gear ring flange 141 and a rotor coupling flange 142. FIG. 4 again shows in detail the attachment of the gear ring driver 140 to the gear ring 12 and the outer mast 14. A plurality of through-holes 14011 are formed in the outer flange 1401 of the gear ring driver 140 as shown in FIG. 5a, wherein the gear ring driver 140 with the outer flange 1401 can be attached to corresponding means of attachment (see FIG. 2) of the gear ring 12 by means of appropriate screws passing through the through-holes 14011, such that it can be mounted so as to rotate with the latter. Alternatively or additionally to such a screwed connection between the outer flange 1401 and the gear ring 12, the surfaces of the gear ring 12 and of the outer flange 1401 of the gear carrier 140 that are to be brought into contact with one another can be provided with additional corresponding toothing or cross-toothing.

On the side remote from the outer flange 1401, an inner flange 1402 is formed on the gear ring driver 140, which has a plurality of through-holes 14021 (indicated by dashed lines). The gear ring driver 140 is fastened to the outer mast 14 by means of screws, which cross the through-holes 14021, and selected blind holes 1411 (indicated by dashed lines) in the outer mast/gear ring flange 141.

As tests have shown, the torque transfer from the gear ring 12, or more particularly, the gear ring driver 140 to the outer mast 14 can be improved and secured. For this purpose, an additional form-fit connection between the outer mast/gear ring flange 141 and the inner flange 1402 of the gear ring driver 140 is introduced. To this end, the surfaces of the outer mast/gear ring flange 141 and of the inner flange 1402 that are to be brought into contact are each provided with additional corresponding toothing or cross-toothing 1412; 14022. The cross-shaped configuration is indicated by crosses in the figures. The toothed portions in each case project from the flange surfaces and engage each other in a form-fitting manner when the outer mast/gear ring flange 141 and inner flange 1402 are screwed together. In addition to a torque transfer over a large surface area through the contact of the outer mast/gear ring flange 141 with the inner flange 1402 of the gear ring driver 140, the cross-toothing on both faces secures the seating of the contact surfaces of the flanges.

The helicopter transmission 1 shown here has four planetary gear carriers 11 that can rotate about fixed axes, whose planetary gears 111 enable the gear ring 12 to rotate. Here all the radial bearings 113, 130, 172, 151 are designed in the form of tapered roller bearings. In particular, the planetary gear carrier bearings 113 should be embodied in the form of tapered roller bearings, since this leads to the achievement of increased maintenance intervals or lubricant monitoring and replenishment intervals.

The rolling elements of the tapered roller bearings are preferably made from ceramic, in particular from silicon nitride or zirconium dioxide. As tests have shown, the lubrication must be monitored and replenished less often when such tapered roller bearings are used. Also the wear of the tapered roller bearings was less severe in service.

Optionally, the bearing mast 13 can be attached on the drive train side outside the transmission housing 10 to the helicopter load-bearing structure (not shown). This is possible because the bearing mast 13 remains locationally and rotationally fixed.

Due to the completely hollow body design of the bearing mast 13 and the outer mast 14, cabling and/or control rods can be completely routed through the helicopter transmission 1. This makes a more compact design possible.

Figure 6:
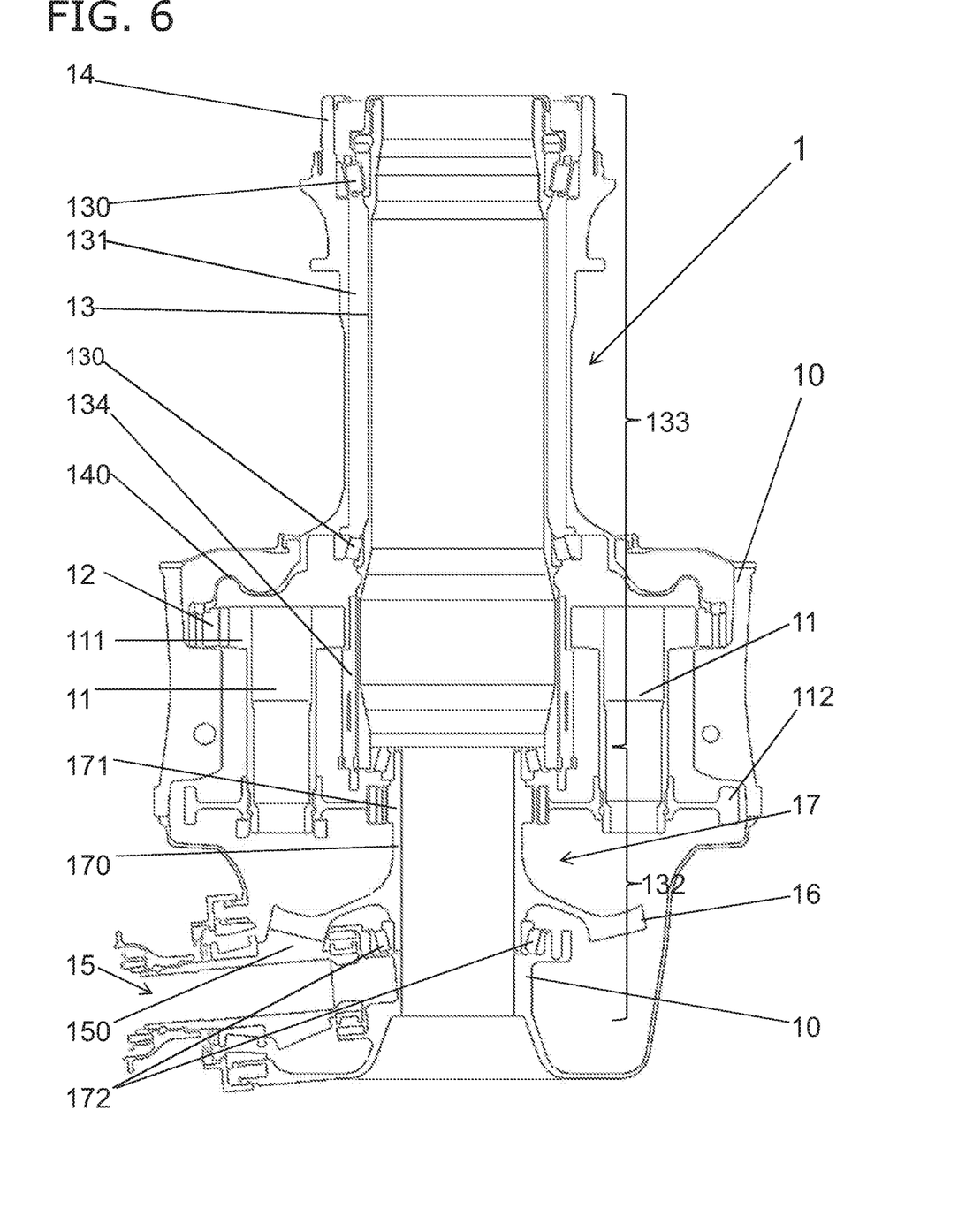
FIG. 6 shows a longitudinal section through another preferred embodiment of the inventive two-part rotor mast, in the installed state.

In accordance with a further preferred embodiment of the inventive rotor mast 2, the bearing mast 13 associated with the rotor mast 2 can also be configured in two parts. A first bearing mast element 132 is arranged on the drive train side, and at least some sections of the bearing mast element 132 are accommodated by a second bearing mast element 133. The first bearing mast element 132 can be regarded as a transmission shaft, about which the drive gear 16 and the sun wheel 17 connected to the drive gear 16 are rotatably mounted. As can be seen in FIG. 6, the sun wheel bearings 172 are arranged between the transmission housing 10 and the sun wheel 17, and the sun wheel 17 is thereby rotatably mounted about the bearing mast element 132 of the bearing mast 13.

The second bearing mast element 133 of the bearing mast 13 is designed to taper from the drive train side in the direction towards the rotor side, whereby during assembly the second bearing mast element 133 is inserted from the drive train side through the central cavity of the transmission housing 10 in the direction towards the rotor side. Here, the second bearing mast element 133 can essentially be attached in the transmission housing 10 by means of a form-fitting bearing element 134 in the form of a sleeve.

In accordance with the further preferred embodiment shown here in FIG. 6, the outer mast 14 and the gear ring driver 140 are, for example, manufactured as a single integral component.

LIST OF REFERENCE SYMBOLS

1 Helicopter rotor transmission
10 Transmission housing
100 Transmission housing mounting
101 Housing cover
11 Planetary gear carrier
P Planetary gear axis
111 Planetary gear (external gear)
1111 External toothing 112 Planetary drive gear
113 Planetary gear carrier bearing
12 Gear ring/internally toothed ring gear
120 Internal toothing
121 Means of attachment
13 Bearing mast (locationally and rotationally fixed)
130 Bearing between bearing mast and outer mast
131 Cavity
132 First bearing mast element
133 Second bearing mast element
134 Form-fitting bearing element
14 Outer mast
140 Gear ring driver
1401 Outer flange
14011 Through-holes
1402 Inner flange
14021 Through-holes
14022 Toothing
141 Outer mast/gear ring flange
1411 Blind hole
1412 Toothing
142 Rotor coupling flange
15 Drive train
150 Drive train gear
151 Drive train mounting (ball bearing mounted)
16 Drive gear (rotating, fixed in position, moving gear ring, bevel gear)
17 Sun wheel (connected to drive gear)
170 Tubular section
171 External toothing
172 Sun wheel bearing
2 Rotor mast
Z Central axis

The invention claimed is:

1. A rotor mast for a rotorcraft wherein the rotor mast is coupleable with a drive unit of a rotor transmission in a rotationally fixed manner,
wherein the rotor mast is configured in two parts, and comprises a bearing mast and an outer mast,
wherein the outer mast, configured as a hollow body, is mounted such that the outer mast is rotatable about a central axis relative to the bearing mast, the outer mast concentrically surrounding the bearing mast,
wherein the outer mast is operatively connectable with the rotor transmission,
wherein the bearing mast is mountable in the rotorcraft in a locationally and rotationally fixed manner, so that the outer mast is coupleable with a main rotor in a rotationally fixed manner, and is settable in rotation with the rotor transmission,
wherein the bearing mast is configured and provided with suitable fixing means such that the bearing mast is arrangeable in a locationally and rotationally fixed manner in a central cavity of the rotor transmission, and the bearing mast is holdable, at least partially passing through a transmission housing of the rotor transmission in the direction of the central axis, and
wherein the bearing mast is tapered from the rotor side in the direction of the side remote from the outer mast, and is provided with suitable fixing means such that the bearing mast is insertable from the rotor side into the central cavity of the transmission housing and is fixable in the latter.

2. The rotor mast of claim 1, wherein the bearing mast is configured and provided with suitable fixing means for holding the bearing mast, completely passing through the transmission housing of the rotor transmission.

3. The rotor mast of claim 1, wherein the bearing mast is configured in two parts, comprising a first, drive train side, bearing mast element and a second bearing mast element.

4. The rotor mast of claim 3, wherein the second bearing mast element of the bearing mast is configured so as to taper from the drive train side in the direction of the side facing towards the outer mast, and is provided with suitable fixing means, such that the second bearing mast element of the bearing mast is insertable from the drive train side into the central cavity of the transmission housing and is fixable in the latter.

5. The rotor mast of claim 1, wherein the bearing mast is configured as a hollow body, such that components are arrangeable passing completely between the bearing mast and the outer mast in the direction of a central axis.

6. The rotor mast of claim 1, wherein the rotor mast is coupleable in a rotationally fixed manner with a drive unit configured as a drive gear,
wherein the drive gear is rotatably mountable on the bearing mast by at least one radial bearing, and, by a sun wheel connected with the drive gear in a rotationally fixed manner, a rotation of at least one planetary drive gear on a side of a respective planetary gear carrier facing towards the drive gear about a respective planetary gear axis is achievable, and
wherein at least one planetary gear, mounted in a fixed manner, associated with at least one planetary drive gear, is surrounded by an internally toothed gear ring, which is rotatable about the central axis, and a force transfer device is attachable or moldable between the gear ring and the outer mast, such that, initiated by a rotational movement of the drive gear, the outer mast and the main rotor, coupled with the outer mast in a rotationally fixed manner, is set in rotation.

7. The rotor mast of claim 6, wherein the force transfer device is designed as a gear ring driver, which is attachable to the gear ring and the outer mast.

8. The rotor mast of claim 7, wherein the outer mast comprises an outer mast/gear ring flange, is configured such that the outer mast is attachable by an inner flange to the gear ring driver and furthermore by an outer flange to the gear ring.

9. The rotor mast of claim 8, wherein the surfaces of the outer mast/gear ring flange and of the inner flange, which are to be brought into contact, are each provided with corresponding toothing or cross-toothing, whereby a form-fit connection is achievable.

10. The rotor mast of claim 6, wherein the gear ring driver is moulded onto the outer mast and thus forms a single integral component, which by an outer flange is attachable to the gear ring.

11. The rotor mast of claim 1, wherein a plurality of radial bearings are arranged between the bearing mast and the outer mast, wherein the radial bearings are tapered roller bearings.

12. The rotor mast of claim 11, wherein the rolling elements of the tapered roller bearings are made from ceramic.

13. A helicopter, comprising the rotor mast of claim 1.

14. A rotor mast for a rotorcraft wherein the rotor mast is coupleable with a drive unit of a rotor transmission in a rotationally fixed manner,
wherein the rotor mast is configured in two parts, and comprises a bearing mast and an outer mast,
wherein the outer mast, configured as a hollow body, is mounted such that the outer mast is rotatable about a central axis relative to the bearing mast, the outer mast concentrically surrounding the bearing mast, wherein the outer mast is operatively connectable with the rotor transmission, wherein the bearing mast is mountable in the rotorcraft in a locationally and rotationally fixed manner, so that the outer mast is coupleable with a main rotor in a rotationally fixed manner, and is settable in rotation with the rotor transmission, wherein the rotor mast is coupleable in a rotationally fixed manner with a drive unit configured as a drive gear, wherein the drive gear is rotatably mountable on the bearing mast by at least one radial bearing, and, by a sun wheel connected with the drive gear in a rotationally fixed manner, a rotation of at least one planetary drive gear on a side of a respective planetary gear carrier facing towards the drive gear about a respective planetary gear axis is achievable, wherein at least one planetary gear, mounted in a fixed manner, associated with at least one planetary drive gear, is surrounded by an internally toothed gear ring, which is rotatable about the central axis, and a force transfer device is attachable or moldable between the gear ring and the outer mast, such that, initiated by a rotational movement of the drive gear, the outer mast and the main rotor, coupled with the outer mast in a rotationally fixed manner, is set in rotation, wherein the force transfer device is designed as a gear ring driver which is attachable to the gear ring and the outer mast, and wherein the outer mast comprises an outer mast/gear ring flange, is configured such that the outer mast is attachable by an inner flange to the gear ring driver and furthermore by an outer flange to the gear ring.

15. The rotor mast of claim 14, wherein the surfaces of the outer mast/gear ring flange and of the inner flange, which are to be brought into contact, are each provided with corresponding toothing or cross-toothing, whereby a form-fit connection is achievable.

16. A rotor mast for a rotorcraft wherein the rotor mast is coupleable with a drive unit of a rotor transmission in a rotationally fixed manner, wherein the rotor mast is configured in two parts, and comprises a bearing mast and an outer mast, wherein the outer mast, configured as a hollow body, is mounted such that the outer mast is rotatable about a central axis relative to the bearing mast, the outer mast concentrically surrounding the bearing mast, wherein the outer mast is operatively connectable with the rotor transmission, wherein the bearing mast is mountable in the rotorcraft in a locationally and rotationally fixed manner, so that the outer mast is coupleable with a main rotor in a rotationally fixed manner, and is settable in rotation with the rotor transmission, wherein the rotor mast is coupleable in a rotationally fixed manner with a drive unit configured as a drive gear, wherein the drive gear is rotatably mountable on the bearing mast by at least one radial bearing, and, by a sun wheel connected with the drive gear in a rotationally fixed manner, a rotation of at least one planetary drive gear on a side of a respective planetary gear carrier facing towards the drive gear about a respective planetary gear axis is achievable, wherein at least one planetary gear, mounted in a fixed manner, associated with at least one planetary drive gear, is surrounded by an internally toothed gear ring, which is rotatable about the central axis, and a force transfer device is attachable or moldable between the gear ring and the outer mast, such that, initiated by a rotational movement of the drive gear, the outer mast and the main rotor, coupled with the outer mast in a rotationally fixed manner, is set in rotation, and wherein the gear ring driver is moulded onto the outer mast and thus forms a single integral component, which by an outer flange is attachable to the gear ring.

* * * * *